INVENTORS
WILLIAM T. HAGE
ERNEST A. GARDNER

ATTORNEYS

Feb. 17, 1970   W. T. HAGE ET AL   3,495,457
MATERIAL LEVEL SENSING DEVICE
Filed Oct. 27, 1967   2 Sheets-Sheet 2

INVENTORS
WILLIAM T. HAGE
ERNEST A. GARDNER
BY
ATTORNEYS

United States Patent Office 3,495,457
Patented Feb. 17, 1970

3,495,457
MATERIAL LEVEL SENSING DEVICE
William T. Hage, Alliance, and Ernest A. Gardner, North Canton, Ohio, assignors to Mechtron-Genco Corporation, a corporation of Ohio
Filed Oct. 27, 1967, Ser. No. 678,598
Int. Cl. G01f 23/00
U.S. Cl. 73—301
3 Claims

ABSTRACT OF THE DISCLOSURE

A sensor assembly for detecting variations in the level of material in a container. The sensor comprises an elongated deformable tubular body having electrical conductors mounted on diametrically opposite portions of the interior of the tube. The sensor assembly is partially collapsed, by the pressure of the material against the sensor assembly, as the level of material in the container is raised to thereby vary the electrical resistance of a circuit as a function of the rise in the level of the material. The sensor assembly is expanded by fluid pressure as the level of the material in the container is lowered to thereby vary the electrical characteristic of the circuit as a function of the lowering in the level of the material.

---

The present invention relates to apparatus for detecting variations in the level of material in a container, and more particularly relates to a sensor assembly operable to provide a signal indicating the level of aggregate material in a bin.

In many different environments, it is often desirable to be able to detect variations in the level of material in a container. To this end, some known sensor assemblies vary the resistance of an electrical circuit as a function of variations in the level of material in a container. These known sensor assemblies commonly include an envelope or body made of a resiliently deformable material in which electrical conductors are mounted. When the level of material in the container is raised, the enevelope is partially collapsed by the inward pressure of the material against the envelope. This collapsing of the envelope decreases the electrical resistance of a circuit as a function of the rise in the level of the material in the container which brings the conductors into an increasingly contiguous relationship. Conversely, when the level of the material in the container is lowered, the envelope expands outwardly to move the conductors apart and thereby increases the resistance of the electrical circuit.

Known sensor assemblies rely upon the inherent resiliency of the envelope to move the conductors apart when the level of material in the container is lowered. This inherent resiliency of the envelope varies as a function of many factors, including aging of the material forming the envelope, the pressure applied against the envelope by the material in the container, the temperature of the envelope, and chemical interactions between the envelope and the material in the container. Thus, these known sensor assemblies are unsuitable for use in many environments due to their reliance on the variable inherent resiliency of the envelope to move the conductors apart when the level of the material in the container is lowered. These known sensor assemblies are particularly unsuitable for use in high temperature environments, due to a tendency of the envelope to lose its resilience or to increase in pliability at high temperatures.

An important object of the present invention is to provide a new and improved reliable and positive acting sensor assembly for detecting variations in the level of material in a container.

Another object of the present invention is to provide a new and improved reliable sensor assembly for continuously detecting variations in the level of materials at a high temperature in a container.

A further object of the present invention is to provide a new and improved sensor assembly for detecting the level of material in a container and which includes a part which contacts the material and moves due to the pressure of the material acting thereon, and wherein separate controllable means is provided to restore the part to its original position when the level of material changes and the pressure of the material acting on the part decreases.

Still another object of the present invention is to provide a new and improved sensor assembly for detecting the level of materials in a container and having a positive acting controllable means for moving apart conductors in an envelope when the level of material in the container is lowered or decreased to thereby vary an electrical characteristic of a circuit as a function of the lowering of the level of material in the container.

A still further object of the present invention is the provision of a new and improved sensor assembly, as noted in the next preceding paragraph, wherein the means for moving the conductors apart comprises means for providing a controllable fluid pressure within the envelope.

These and other objects and features of the invention will become more apparent from the following description taken in connection with the accompanying drawings wherein.

This invention relates to a sensor assembly for continuously detecting variations in the level of material in a container. The sensor assembly includes a pair of elongated sections of electrically conductive material which is mounted in a deformable body or envelope and connected in an electrical circuit. When the level of material in the container is increased or raised, the envelope is deformed inwardly or partially collapsed by the pressure of the rising material to bring the elongated sections of electrically conductive material into an increasingly contiguous relationship to thereby decrease the resistance of the circuit as a function of the increase or rise in the level of material in the container. When the level of material is decreased or lowered, air or other fluid is introduced into the envelope to expand the envelope and press the elongated sections of electrically conductive material away from each other. This outward movement of the elongated sections of electrically conductive material decreases the contiguous relationship of the sections of electrically conductive material and increases the resistance of the circuit as a function of the decrease in the level of the material in the container.

Figure 1:
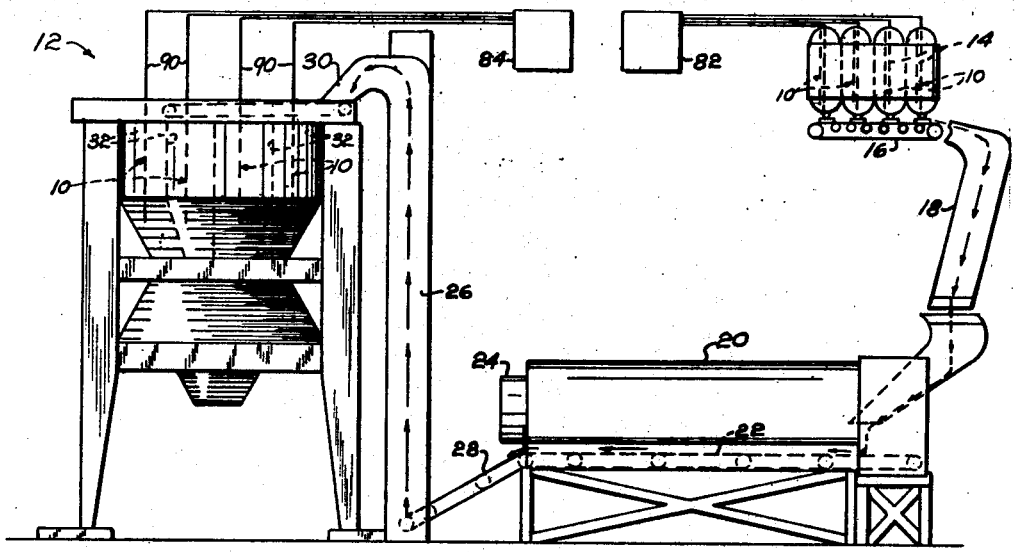
FIG. 1 is a schematic illustration of an arrangement or facility for drying aggregates used in asphalt bituminous mix.

While being usable in many other environments, a plurality of sensor assemblies 10 embodying the present invention are illustrated in FIG. 1 in connection with a facility 12 for drying aggregates used in an asphalt bituminous mix. The drying facility 12 includes a plurality of storage bins or hoppers 14, shown schematically, for holding materials or aggregates of varying grain size. The aggregates are transported by a conveyor 16 and a chute 18 to a heater or dryer 20. The dryer 20 includes an interior conveyor 22 which transports the aggregates past the flame of a burner 24. The burner 24 heats the aggregates to dry them in a conventional manner.

Figure 2:
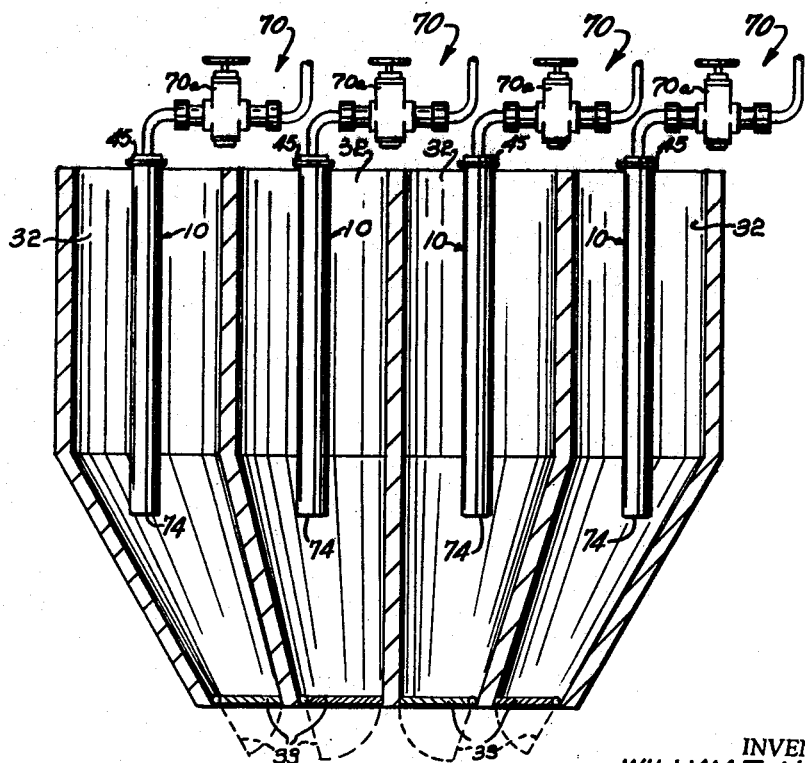
FIG. 2 is a schematic illustration of a plurality of sensor assemblies used in conjunction with a plurality of storage bins of the facility of FIG. 1, to detect variations in the level of material in the storage bins.

The hot dry aggregates are transported from the dryer 20 to an elevator 26 by a discharge chute 28. The elevator 26 lifts the hot aggregates upwardly to a chute 30 leading to a plurality of sorting screens (not shown) of known construction. The sorting screens segregate the aggregates according to their grain size and conduct the aggregates to storage or discharge bins 32 (see FIGS. 1 and 2) each of which holds an aggregate of a particular grain size. When required for forming an asphalt bituminous mix, the aggregates are selectively discharged from the bins 32 through gates 33 (see FIG. 2).

Figure 3:
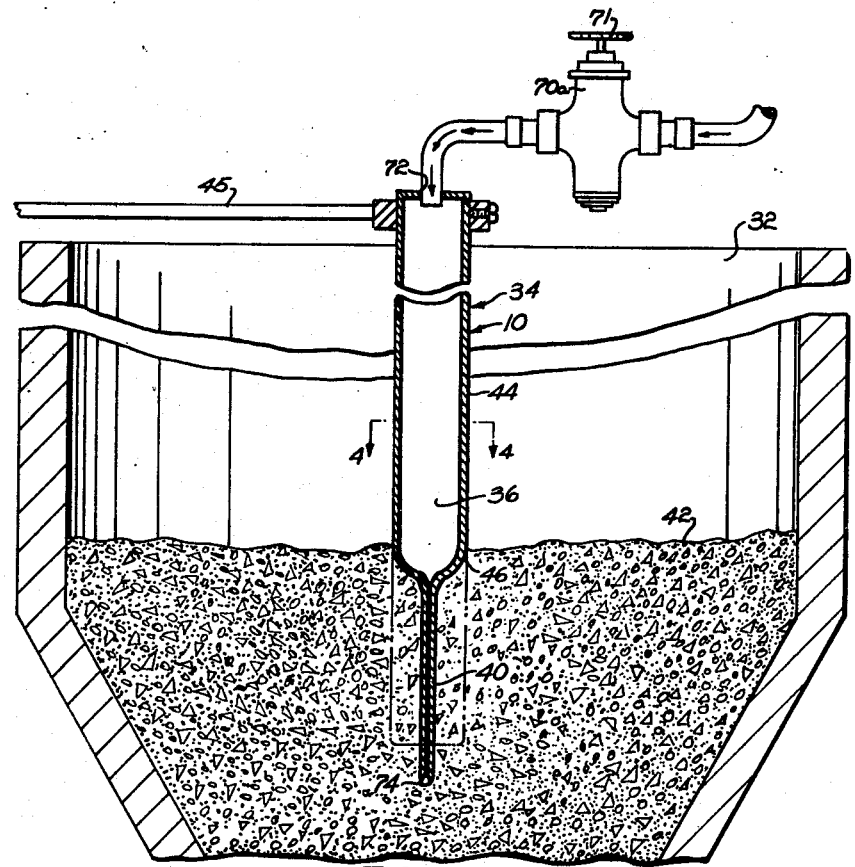
FIG. 3 is a sectional view of one of the sensor assemblies and storage bins of FIG. 2.

A sensor assembly 10 is associated with each of the bins 32 to continuously detect variations in the level of aggregate in the bins. The sensor assemblies 10 each include an elongated body or envelope 34 (see FIGS. 2 and 3) which extends downwardly into the associated bin 32. The envelope 34 is formed of a deformable, electrically insulating material, such as rubber, and defines a longitudinally extending interior passage or cavity 36 (see FIG. 3). As shown in FIG. 3, a lower portion 40 of the envelope 34 is pressed inwardly from a normal or expanded position, indicated in dashed lines in FIG. 3, to a collapsed position, shown in solid lines in FIG. 3, by the pressure of the hot aggregate 42 against the outer surface of the envelope. An upper portion 44 of the envelope 34 engages a support frame 45 and remains in the normal or expanded position, since it is not engaged by the aggregate 42. A transition area or zone 46, between the expanded upper portion 44 of the envelope 34 and the collapsed lower portion 40 of the envelope is located at a level corresponding to approximately the upper surface or level of the hot aggregate 42 in the bin 32.

When the level of aggregate 42 in the bin 32 is raised or lowered, the transition area 46 between the upper and lower portions 40 and 44 of the envelope 34 is correspondingly raised or lowered. Thus, when the level of aggregate in the bin 32 is raised or increased, the extent of the collapsed lower portion 40 of the envelope 34 is similarly increased. Conversely, when the level of the aggregate in the bin 32 is lowered or decreased, the extent of the collapsed lower portion 40 of the envelope 34 is similarly decreased.

Figure 4:
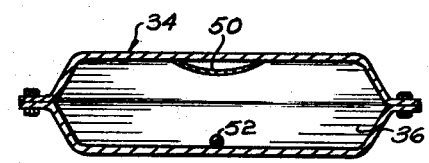
FIG. 4 is an enlarged sectional view, taken along the line 4—4 of FIG. 3, further illustrating the structure of the sensor assemblies.
Figure 5:
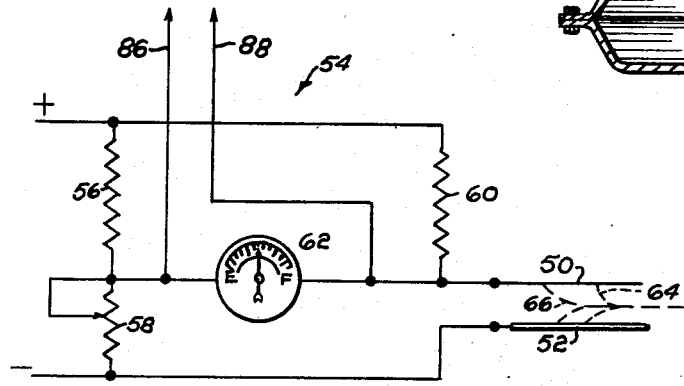
FIG. 5 is a schematic illustration of a circuit including the sensor assembly of FIGS. 3 and 4.

A pair of elongated sections 50 and 52 of electrically conductive material (see FIGS. 4 and 5) are mounted in the envelope 34 on opposite sides of the cavity 36 to enable variations in the level of aggregate in the bin 32 to be detected by detecting corresponding variations in the extent of the collapsed lower portion 40 of the envelope 34.

To this end, the electrically conductive section 50 is formed by a nichrome or other suitable conductive ribbon mounted on one side of the envelope defining the cavity 36 while the electrically conductive section 52 is formed by a suitable conductive wire mounted on the opposite side of the envelope defining the cavity. The two sections 50 and 52 engage each other throughout the extent of the collapsed lower portion 40 of the envelope 34. Therefore, the contiguous relationship of the two sections 50 and 52 is increased as a direct function of an increase or rise of the level of the aggregate 42, since the rising aggregate 42 causes a corresponding increase in the extent of the collapsed lower portion 40 of the envelope 34. Similarly, the contiguous relationship of the two sections 50 and 52 is decreased as a direct function of a decrease or lowering of the level of the aggregate 42 with a corresponding decrease in the collapsed lower portion 40 of the envelope 34.

The sections 50 and 52 are connected in an electrical circuit 54 to facilitate continuous detection of the variations in the contiguous relationship of the sections 50 and 52, and the corresponding variations in the level of the aggregate 42 in the bin 32. The circuit 54 is, in the present instance, of the well-known Wheatstone bridge type and includes resistances 56, 58 and 60 which are connected to a meter 62 and a source of power. When the contiguous relationship between the sections 50 and 52 is varied, a corresponding change occurs in the flow of current through the meter 62. Thus, when the bin 32 is nearly empty there is a relatively short length of the sections 50 and 52 in mutual engagement, as shown in dashed lines at 64 in FIG. 5. The sections 50 and 52 will then form a relatively long path having a high resistance to the flow of current and the meter 62 will indicate that the level of aggregate in the bin 32 is relatively low. Conversely, when the bin 32 is nearly full, there will be a relatively long length of the sections 50 and 52 in engagement, as shown in dashed lines at 66 in FIG. 5. The sections 50 and 52 then form a relatively short path of low resistance to the flow of current and the meter 62 will indicate that the level of aggregate 42 in the bin 32 is relatively high.

To enable the sensor assembly 10 to accurately detect variations in the level of aggregate 42 in the bin 32, it is essential that the envelope 34 be expanded above the upper surface of the aggregate so that the contiguous or touching length of the sections 50 and 52 varies directly with changes in the level of the aggregate. In order to provide a positive expansion of the envelope 34 when the level of material decreases, a fluid pressure is applied to the cavity 36 through an inlet 72 in the envelope. The fluid pressure in the cavity 36 presses outwardly on the sections 50 and 52 and on the interior surfaces of the cavity. Of course, the outward pressure of the fluid in the cavity 36 is less than the inward pressure of the aggregate 42 on the envelope so that the envelope can collapse to move the sections 50 and 52 into engagement.

The fluid pressure which is applied to the cavity 36 is directed through the inlet 72 in the envelope from a suitable source 70 of fluid pressure which delivers a continuous fluid stream into the cavity 36. The source 70 of fluid pressure may comprise a compressor, a storage tank, or any suitable source of fluid pressure which may be available. Preferably, air pressure is readily available and may be utilized. However, other fluids may also be utilized in order to provide some control of a property or characteristic of the envelope or conductors 50, 52.

The system also includes means for maintaining a substantially constant pressure in the cavity 36 of the envelope. Such a means is preferably in the form of a pressure regulator 70a which maintains the pressure within the cavity 36 substantially constant. The pressure regulator 70a is illustrated in the drawings as being located in the fluid system intermediate the source 70 of fluid and the cavity 36. The pressure regulator 70a may be of any conventional type and is preferably adjustable as indicated by the adjusting knob 71. By adjusting the regulator 70a, the pressure at which the cavity 36 is maintained may be adjusted so as to thereby control the fluid pressure within the cavity 36. By such a control, the force of the fluid acting in opposition to the aggregate in the bin may be varied. As a result, a controlled force is applied by the fluid pressure to the envelope to restore the envelope to its normal position in opposition to the force of the material acting against the envelope. This permits the system to be readily adaptable for use with materials of different bulk densities. This controlled restoring force principle may also be utilized with a sensor which does not provide a continuous signal, but may be considered as merely a spot sensor.

An outlet orifice or opening 74 is provided at a lowermost end portion of the envelope 34 to enable the fluid to flow through the envelope. The fluid flows from the inlet 72, through the upper and lower portions 44 and 40 of the envelope 34 to the outlet 74. The collapsed lower portion 40 of the envelope restricts, but does not block, the flow of fluid therethrough. If desired, channels or flow passages of a suitable shape may be provided in the envelope to insure fluid flow through the outlet 74 even though the envelope is collapsed. This flow of fluid through the envelope may provide some control of the temperature of the conductors 50, 52. The orifice 74 may be provided by a check valve which opens at a predetermined pressure to provide for flow through the envelope.

Alternatively, the high pressure within the cavity 36 may be provided by a pulsed fluid flow rather than the continuous flow of fluid into the cavity 36 described above. The use of fluid pulses may be particularly important to separate the conductor sections in the event that the conductor sections resist separation. The pulsed flow may be provided by controlling a valve, not shown, or pump associated with the supply of fluid.

The rate at which each of the bins 32 is emptied varies depending upon the demand for the particular aggregate associated with the bin. Therefore, a control assembly 82 (FIG. 1) is connected to the hoppers 14 for regulating the flow of aggregate of each grain size to the dryer 20 and the bins 32. An indicator or readout assembly 84 is connected to each of the sensor assemblies 10, by leads 86 and 88 in cables 90 (see FIGS. 1 and 5), to provide an operator of the control assembly 82 with an indication of the level of aggregate in each of the bins 32. The operator can then operate the control assembly 82 to regulate the flow of aggregate from the hoppers 14 to the dryer assembly 20 as a function of the sensed level of aggregate in each of the bins 32. Of course, the structure of the control assembly 82 could be changed to enable the sensor assemblies 10 to be connected to directly regulate the flow of aggregate from the hoppers 14 without the necessity of an operator.

In view of the foregoing, it can be seen that a new and improved sensor assembly 10 has been provided which detects variations in the level of material in a container or bin 32. This continuous sensing is accomplished by varying the extent of engagement of the sections 50 and 52 and the resistance of the circuit 54 as a function of variations of the level of material in the bin or container. Thus, when the level in the bin 32 is increased, the envelope 34 is partially collapsed to increase the contiguous relationship of the sections 50 and 52 to thereby decrease the amount of resistance in the circuit 54 by an amount which is a function of the increase in the level of material in the bin 32. Conversely, when the level of material in the bin 32 is decreased, the envelope 34 is expanded outwardly by controlled fluid pressure against the surfaces of the cavity 36. The outward expansion of the envelope 34 decreases the contiguous relationship of the sections 50 and 52 and increases the resistance of the circuit 54 by an amount which is a function of the decrease in the level of aggregate in the bin 32.

It should be noted that a positive operation of the sensor assembly 10 is provided whenever the level of aggregate is either increased or decreased. This positive operation results from the inward pressure of the aggregate 42 against the envelope 34 and the somewhat smaller outward pressure of the fluid in the cavity 36. In addition to providing a positive expansion of the envelope 34, the fluid also flows through the envelope to heat or cool the sensor assembly, as required.

It is anticipated that many changes and modifications may be made in the illustrated structure of the sensor assembly by those skilled in the art. Thus, while the sensor assembly has been illustrated as using a pair of separate electrically conductive sections 50 and 52, it is contemplated that these sections could, if desired, be formed by a single doubled-over piece of material. It is also contemplated that an electrical characteristic, other than resistance, of a circuit other than the illustrated Wheatstone bridge circuit could be varied by moving the electrically conductive sections relative to each other. Although the sensor assembly 10 has been described in connection with the bins 32 of a facility for drying aggregates used in asphalt bituminous mix plants, the sensor assembly may be used in many other environments and may also be used in association with the supply hoppers 14 to indicate the level of material therein.

What is claimed is:

1. An apparatus for detecting variations in the level of material in a container, said apparatus comprising an elongated deformable body having imperforate wall portions forming an elongated cavity, first and second elongated sections of electrically conductive material mounted on said imperforate wall portions and disposed in said cavity, said body being deformable inwardly by the pressure of material in said container against said imperforate wall portions to vary the position of said first and second elongated sections of electrically conductive material relative to each other upon a change in the level of material in said container, said body having an upper end portion with an inlet connected in fluid communication with said cavity and enabling said cavity to be connected to a source of fluid for providing pressure in said cavity to restore portions of said body to their undeformed condition when the material level changes, and said body having a lower end portion with a fluid outlet therein forming the only fluid outlet for enabling fluid to flow out of said cavity whereby fluid entering said cavity at said inlet must flow downwardly through the length of said enlongated cavity to said fluid outlet to thereby provide for heat transfer between said body and fluid which flows through said cavity from said inlet to said outlet.

2. An apparatus as set forth in claim 1 further including electrical circuit means connected to said first and second elongated sections of electrically conductive material for indicating variations in their relative positions to thereby provide an indication of the level of material in said container.

3. An apparatus as set forth in claim 1 further including control means for regulating the fluid pressure in said cavity to thereby enable said apparatus to be used with materials of different densities.

References Cited

UNITED STATES PATENTS

| | | | |
|---|---|---|---|
| 937,213 | 10/1909 | Hough et al. | 209—3 |
| 1,023,582 | 4/1912 | Monroe | 209—240 |
| 1,987,242 | 1/1935 | Madsen | 209—3 |
| 3,153,342 | 10/1964 | Pierce et al. | 73—301 |
| 3,350,940 | 11/1967 | Stone | 73—301 |
| 2,713,793 | 7/1955 | Andersen | 73—301 |
| 2,955,466 | 10/1960 | Coles | 73—290 |

FOREIGN PATENTS

| | | |
|---|---|---|
| 716,958 | 10/1954 | Great Britain. |

S. CLEMENT SWISHER, Primary Examiner